US006437058B2

(12) United States Patent
Furihata et al.

(10) Patent No.: US 6,437,058 B2
(45) Date of Patent: Aug. 20, 2002

(54) POLYMERS AND POSITIVE RESIST COMPOSITIONS

(75) Inventors: Tomoyoshi Furihata; Hideto Kato; Yoshinori Hirano, all of Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/777,903

(22) Filed: Feb. 7, 2001

(30) Foreign Application Priority Data

Feb. 8, 2000 (JP) ........................................ 2000-030483

(51) Int. Cl.$^7$ ........................... C08G 8/30; C08L 61/14; C08L 61/06; C08L 61/04
(52) U.S. Cl. ..................... 525/502; 525/504; 525/505; 528/143; 528/158; 528/159; 528/162; 528/171; 528/290; 528/373; 528/422; 430/190; 430/192
(58) Field of Search ................... 528/112, 106, 528/125, 143, 158, 159, 162, 171, 290, 373, 422; 430/190, 192; 525/502, 504, 505

(56) References Cited

U.S. PATENT DOCUMENTS 5,494,773 A * 2/1996 Tan et al. .................. 430/192

OTHER PUBLICATIONS

English Abstract of Japan 62–215947.

English Abstract of Japan 3–22619.

* cited by examiner

Primary Examiner—Duc Truong
(74) Attorney, Agent, or Firm—Millen, White, Zelano & Branigan, P.C.

(57) ABSTRACT

A polymer in the form of a novolac resin is provided wherein the novolac resin has a weight average molecular weight of 1,000–30,000, some of the hydrogen atoms of hydroxyl groups are replaced by 1,2-naphthoquinonediazidosulfonyl ester groups, and some of the hydrogen atoms of the remaining hydroxyl groups are replaced by substituted acetal groups and/or crosslinked within a molecule or between molecules with crosslinking groups having C—O—C linkages. The polymer is formulated into a positive resist composition having improved uniformity, sensitivity, resolution and pattern profile as well as improved heat resistance, film retention, substrate adhesion and storage stability.

15 Claims, No Drawings

POLYMERS AND POSITIVE RESIST COMPOSITIONS

This invention relates to a novel polymer in the form of a novolac resin in which some of the hydrogen atoms of hydroxyl groups are replaced by 1,2-naphthoquinonediazidosulfonyl ester groups and acid labile groups, and a positive resist composition comprising the polymer.

BACKGROUND OF THE INVENTION

Prior art novolac resist materials generally use a novolac resin and a photoactive compound as two main components. Numerous studies have been made on the novolac resin, photoactive compound and solvent in order to develop a resist material which is improved in sensitivity, resolution, pattern profile, heat resistance, film retention, adhesion-to-substrate, and shelf stability, and which can accommodate the wavelength of a light source in various aligner.

With respect to the novolac resin, for example, reducing the average molecular weight of a novolac resin being synthesized leads to an increased resolution at the sacrifice of heat resistance and film retention (see BREAK THROUGH, February 1992, page 18). One prior art solution is to remove a low molecular weight fraction from the novolac resin by re-precipitation treatment.

In order that the novolac resin be improved in contrast without lowering sensitivity, a method of optimizing the bond mode of methylene is considered (see Handbook of Semiconductor IC Resist Materials, 72, 1996). Allegedly a high-ortho-novolac is effective in enhancing the contrast of a resist without lowering the dissolution rate of exposed areas.

A combination of a base polymer in the form of a novolac resin having at least three acid-decomposable acetal bonds with a photoacid generator is proposed in JP-A 62-215947 as having improved resolution and storage stability.

With respect to the photoactive compound, research works comply with the change of the stepper light source from g-line to i-line. Since resist compositions comprising conventional benzophenone photoactive compounds have a low transmittance, it was proposed to use non-benzophenone photoactive compounds having less absorption of i-line (see Nikkei Microdevice, April 1992, page 45).

Research works have also been made on the solvent. A positive resist composition is typically prepared using a conventional cellosolve solvent such as ethyl cellosolve acetate. When it is allowed to stand, even after filtration through a filter with a pore size of 0.2 μm, very fine microparticle which are not visible to the naked eyes can form in the resist composition. Some microparticulates have a size of more than 0.5 μm. If a resist pattern of about 1 μm is formed on a wafer using the positive resist composition containing such relatively large microparticulates, the microparticulates are left on the pattern, leading to a lower resolution and exacerbating the manufacture yield of integrated circuits. In this regard, it is proposed in JP-B 3-22619, for example, to formulate a resist composition having improved long-term storage stability by dissolving an alkali-soluble resin and a 1,2-quinonediazide compound in a monooxycarboxylate-containing solvent.

These approaches dealing with the novolac resin and photoactive compound have drawbacks. In order to realize a high resolution resist composition of good performance by combining the above measures, many additional steps are needed for the resist composition-formulating process, adding to the cost. The approach focusing at the solvent also has drawbacks. Insofar as a 1,2-quinonediazide compound monomer is used as the photoactive compound in a resist composition as described above, the monomer will precipitate after filtration, detracting from the long-term shelf stability of the resist composition. A further improvement is thus desired.

SUMMARY OF THE INVENTION

An object of the invention is to provide a novel and improved polymer which is formulated into a positive resist composition having improved uniformity, sensitivity, resolution and pattern profile as well as improved heat resistance, film retention, substrate adhesion and storage stability. Another object is to provide a positive resist composition comprising the polymer.

The inventors have found that a polymer in the form of a novolac resin in which some of the hydrogen atoms of the hydroxyl groups are replaced by 1,2-naphthoquinonediazidosulfonyl ester groups and some of the hydrogen atoms of the remaining hydroxyl groups are replaced by specific acid labile groups or crosslinked with acid labile crosslinking groups, that is, one component novolac polymer having both photosensitive groups and acid labile or acid labile crosslinking groups incorporated in its molecule is improved in dissolution contrast, that is, differential dissolution rate in a developer between radiation-exposed areas and unexposed areas. This polymer is formulated into a positive resist composition which has improved uniformity, sensitivity, resolution and pattern profile in microfabrication as well as improved heat resistance, film retention, substrate adhesion and storage stability.

In one aspect, the invention provides a polymer in the form of a novolac resin comprising recurring units of the following structural formula (1) and having a weight average molecular weight of 1,000 to 30,000 calculated as polystyrene. Some of the hydrogen atoms of hydroxyl groups on the novolac resin are replaced by 1,2-naphthoquinonediazidosulfonyl ester groups, and some of the hydrogen atoms of the remaining hydroxyl groups are replaced by acid labile groups of the following general formula (2) and/or crosslinked within a molecule or between molecules with crosslinking groups having C—O—C linkages of the following general formula (3).

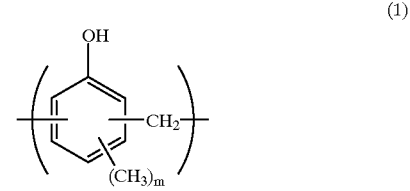
(1)

Herein m is an integer of 0 to 3.

(2)

Herein $R^1$ and $R^2$ are independently hydrogen or a straight, branched or cyclic alkyl group of 1 to 6 carbon atoms, $R^3$ is a straight, branched or cyclic alkyl group of 1 to 30 carbon atoms, aryl group of 6 to 20 carbon atoms or aralkyl group of 7 to 20 carbon atoms, or R$^1$ and R$^2$, R$^1$ and R$^3$, or R$^2$ and R$^3$, taken together, may form a ring, and each of R$^1$, R$^2$ and R$^3$ is a straight of branched alkylene group of 1 to 18 carbon atoms when they form a ring.

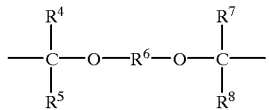

(3)

Herein R$^4$, R$^5$, R$^7$ and R$^8$ are independently hydrogen or a straight, branched or cyclic alkyl group of 1 to 6 carbon atoms, or R$^4$ and R$^5$, and R$^7$ and R$^8$, taken together, may form a ring, and each of R$^4$, R$^5$, R$^7$ and R$^8$ is a straight of branched alkylene group of 1 to 17 carbon atoms when they form a ring, and R$^6$ is a divalent hydrocarbon group of 1 to 6 carbon atoms which may contain an oxygen atom.

In another aspect, the invention provides a positive resist composition comprising the polymer defined above.

DESCRIPTION OF THE PREFERRED EMBODIMENTS

The novel polymer or high molecular weight compound of the invention is in the form of a novolac resin comprising recurring units of the structural formula (1), wherein some of the hydrogen atoms of hydroxyl groups are replaced by 1,2-naphthoquinonediazidosulfonyl ester groups, and some of the hydrogen atoms of the remaining hydroxyl groups are replaced by acid labile groups of the general formula (2) and/or some of the hydrogen atoms of the remaining hydroxyl groups are crosslinked within a molecule or between molecules with crosslinking groups having C—O—C linkages of the general formula (3).

In formula (1), m is an integer of 0 to 3, and preferably 1 or 2.

In formula (2), R$^1$ and R$^2$ may be the same or different and stand for hydrogen or straight, branched or cyclic alkyl groups of 1 to 6 carbon atoms, such as methyl, ethyl, n-propyl, isopropyl, n-butyl, isobutyl, tert-butyl, n-pentyl, isopentyl, neopentyl, hexyl, cyclopentyl, and cyclohexyl.

Examples of the straight, branched or cyclic alkyl group of 1 to 30 carbon atoms represented by R$^3$ include methyl, ethyl, propyl, isopropyl, n-butyl, isobutyl, tert-butyl, n-pentyl, isopentyl, neopentyl, n-hexyl, n-heptyl, n-octyl, n-decyl, n-dodecyl, n-hexyl, palmityl, n-stearyl, cyclopropyl, and cholesteryl. Examples of the aryl groups of 6 to 20 carbon atoms include phenyl, tolyl, ethylphenyl, propylphenyl, dimethylphenyl, methylethylphenyl, naphthyl, furyl and biphenyl. Examples of the aralkyl group of 7 to 20 carbon atoms include benzyl, methylbenzyl, propylbenzyl and dimethylbenzyl.

A pair of R$^1$ and R$^2$, a pair of R$^1$ and R$^3$, or a pair of R$^2$ and R$^3$, taken together, may form a ring. Each of R$^1$, R$^2$ and R$^3$ is a straight of branched alkylene group of 1 to 18 carbon atoms and especially 1 to 8 carbon atoms, when they form a ring.

In formula (3), examples of the straight, branched or cyclic alkyl groups of 1 to 6 carbon atoms represented by R$^4$, R$^5$, R$^7$ and R$^8$ include methyl, ethyl, n-propyl, isopropyl, n-butyl, isobutyl, tert-butyl, n-pentyl, isopentyl, neopentyl, n-hexyl, cyclopentyl, and cyclohexyl. Alternatively, a pair of R$^4$ and R$^5$, and a pair of R$^7$ and R$^8$, taken together, may form a ring. Each of R$^4$, R$^5$, R$^7$ and R$^8$ is a straight of branched alkylene group of 1 to 17 carbon atoms and especially 2 to 8 carbon atoms, when they form a ring.

R$^6$ stands for divalent hydrocarbon groups of 1 to 6 carbon atoms which may contain an oxygen atom, for example, alkylene groups and alkylene groups which are separated by one or more oxygen atoms. Exemplary divalent C$_{1-6}$ hydrocarbon groups which may contain an oxygen atom are given below.

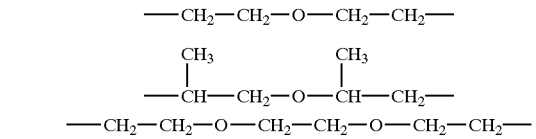

In the polymer of the invention, the percent substitution of 1,2-naphthoquinonediazidosulfonyl ester group is preferably 3 to 30 molt, more preferably 5 to 20 mol % per hydrogen atom of the hydroxyl group in the novolac resin. If the percent substitution of 1,2-naphthoquinonediazidosulfonyl ester group is less than 3 mol %, the retention of a polymer film would be exacerbated, suggesting that a resist composition sometimes fails to form a pattern and becomes useless. If the percent substitution of 1,2-naphthoquinonediazidosulfonyl ester group is more than 30 mol %, the polymer would become difficultly soluble in solvents and thus difficult to formulate a resist composition.

The percent substitution of substituent group of formula (2) and crosslinking group of formula (3), which are commonly referred to as substituted acetal groups, hereinafter, is preferably 1 to 50 mol %, more preferably 1 to 20 mol % per hydrogen atom of the hydroxyl group in the novolac resin. If the percent substitution of substituted acetal group is less than 1 mol %, the resulting resist would be low in resolution and adhesion to the substrate. If the percent substitution of substituted acetal group is more than 50 mol %, exposed areas of the resist would become difficult to be dissolved in a developer, prohibiting pattern formation.

The polymer should have a weight average molecular weight calculated as polystyrene of 1,000 to 30,000, and preferably 3,000 to 20,000. With a weight average molecular weight of less than 1,000, the retention of a polymer film after development and the heat resistance thereof would be poor. With a weight average molecular weight of more than 30,000, the resist would have poor resolution and sensitivity.

The polymer may be prepared by subjecting a novolac resin of formula (1) and 1,2-naphthoquinonediazidosulfonyl chloride to dehydrochlorination reaction and then to addition reaction with an alkenyl ether compound or dialkenyl ether compound in the presence of an acid catalyst. Examples of the alkenyl ether compound are methyl vinyl ether, ethyl vinyl ether, n-propyl vinyl ether, isopropyl vinyl ether, n-butyl vinyl ether, isobutyl vinyl ether, sec-butyl vinyl ether, ethyl 1-propenyl ether, cyclohexyl vinyl ether, methyl 1-propenyl ether, isopropenyl methyl ether, isopropenyl ethyl ether, dihydrofuran and dihydropyran. Examples of the dialkenyl ether compound are ethylene glycol divinyl ether, triethylene glycol divinyl ether, 1,2-propane diol divinyl ether, 1,3-propane diol divinyl ether, 1,3-butane diol divinyl ether, 1,4-butane diol divinyl ether, tetramethylene glycol divinyl ether, neopentyl glycol divinyl ether, hexane diol divinyl ether, 1,4-cyclohexane diol divinyl ether, pentaerythritol divinyl ether, and ethylene glycol diethylene vinyl ether.

As the novolac resin of formula (1), there may be used any of novolac resins having a weight average molecular weight of 1,000 to 30,000 which are obtained by polycondensing a phenol such as p-cresol or m-cresol with an aldehyde such as formaldehyde in the presence of a polycondensation catalyst such as oxalic acid.

Reaction conditions may be selected as appropriate when the novolac resin is reacted with 1,2-naphthoquinonediazidosulfonyl chloride. Preferably reaction is carried out in a solvent at a temperature of 5 to 50° C. for about 1 to 5 hours. Exemplary suitable solvents are 1,4-dioxane, tetrahydrofuran, N,N-dimethylformamide, N,N-dimethylacetamide, acetone, methyl ethyl ketone, and methyl isobutyl ketone.

With respect to the reaction conditions under which substituted acetal groups are introduced, addition reaction is effected in a solvent in the presence of an acid catalyst. Suitable solvents are aprotic polar solvents such as dimethylformamide, dimethylacetamide, tetrahydrofuran, and ethyl acetate, which may be used alone or in admixture. Exemplary acids used as the catalyst are hydrochloric acid, sulfuric acid, trifluoromethanesulfonic acid, p-toluenesulfonic acid, methanesulfonic acid, and pyridinium p-toluenesulfonate.

The polymer of the invention is useful as a base resin of a positive working resist composition. The invention therefore provides a positive working resist composition comprising the polymer dissolved as a base resin in a solvent.

There may be used any of solvents in which the polymer and other resist components have a sufficient solubility and which ensures a film forming ability. Exemplary solvents are cellosolve solvents such as methyl cellosolve, ethyl cellosolve, methyl cellosolve acetate, and ethyl cellosolve acetate; propylene glycol solvents such as propylene glycol monomethyl ether, propylene glycol monobutyl ether, propylene glycol monomethyl ether acetate, propylene glycol dimethyl ether, and propylene glycol monoethyl ether acetate; ester solvents such as butyl acetate, amyl acetate, methyl lactate, ethyl lactate, 3-methoxypropionic acid, ethyl 3-ethoxypropionate; alcohol solvents such as hexanol and diacetone alcohol; ketone solvents such as cyclohexanone and methyl amyl ketone; ether solvents such as methyl phenyl ether and diethylene glycol dimethyl ether; highly polar solvents such as N,N-dimethylformamide and N-methyl-pyrrolidone; and mixtures thereof. An appropriate amount of the solvent used is desirably 1 to 20 times, especially 1 to 15 times the total weight of solids (or inventive novolac resin).

To the resist composition, small amounts of additives such as dyestuffs, pigments and surfactants may be added if desired.

A resist pattern can be formed from the resist composition of the invention, for example, by applying the resist composition onto a substrate such as a silicon wafer, pre-baking the coating at about 80 to 120° C. for about 50 to 300 seconds to form a resist film of 0.5 to 2.0 pm thick, exposing it to pattern radiation, baking at about 90 to 130° C. for about 50 to 300 seconds, and developing with an aqueous solution of tetramethylammonium hydroxide (TMAH), KOH or other bases.

There has been described a novel polymer in the form of a novolac resin in which some of the hydrogen atoms of hydroxyl groups are replaced by 1,2-naphthoquinonediazidosulfonyl ester groups and substituted acetal groups. The polymer is effective as a base resin in a positive resist composition. The positive resist composition comprising the polymer has improved uniformity, sensitivity, resolution and pattern profile in microfabrication as well as improved heat resistance, film retention, substrate adhesion and storage stability.

EXAMPLE

Examples of the invention are given below by way of illustration and not by way of limitation.

Synthetic Example 1

A three-necked flask equipped with a stirrer, condenser, and thermometer was charged with 59.5 g (0.55 mol) of p-cresol, 48.7 g (0.45 mol) of m-cresol, 48.7 g (0.52 mol) of a 37 wt % formaldehyde aqueous solution, and 0.30 g ($2.40 \times 10^{-3}$ mol) of oxalic acid dehydrate as a polycondensation catalyst. While the flask was placed in an oil bath to keep the internal temperature at 100° C., polycondensation was effected for one hour. After the completion of reaction, 500 ml of methyl isobutyl ketone (MIBK) was added to the reaction solution, which was stirred for 30 minutes. With the aqueous layer separated, the product extracted in the MIBK layer was washed 5 times with 300 ml of pure water. After separation, the product was vacuum stripped at 4 mmHg and 150° C. by means of an evaporator, yielding 87 g of novolac resin A.

Synthetic Examples 2, 3

Novolac resins B and C were synthesized as in Synthetic Example 1.

The molar ratio of m-cresol/p-cresol and the molar ratio of formaldehyde/cresol (F/C) are reported in Table 1 together with the weight average molecular weight (Mw) of novolac resins A to C.

It is noted that for the measurement of Mw, a GPC column system (two G-2000H6 tubes, one G-3000H6 tube, and one G-4000H6 tube) by Toso K.K. was used. Measurement was made with eluting solvent THF at a flow rate of 1.5 ml/min and a column temperature of 40° C.

TABLE 1

| Synthetic Example | Novolac resin | m-/p-cresol (molar ratio) | F/C (molar ratio) | Mw |
|---|---|---|---|---|
| 1 | A | 45/55 | 0.59 | 9200 |
| 2 | B | 50/50 | 0.81 | 40000 |
| 3 | C | 50/50 | 0.48 | 800 |

Synthetic Example 4

Under light-shielded conditions, a three-necked flask equipped with a stirrer, dropping funnel, condenser, and thermometer was charged with 120 g (1 mol) of novolac resin A obtained in Synthetic Example 1, 26.8 g (0.10 mol) of 1,2-naphthoquinonediazidosulfonyl chloride, and 400 ml of dioxane. After dissolution, 10.1 g (0.10 mol) of triethylamine was added dropwise such that the internal temperature might not exceed 30° C. After one hour of ripening, the reaction solution was poured into 5,000 ml of 0.1N aqueous hydrochloric acid. The resulting precipitate was collected by filtration, dissolved in 800 g of ethyl acetate, washed with water, and separated. The solvent was removed by vacuum stripping at 40° C., followed by vacuum drying. The resulting resin was dissolved in 400 g of tetrahydrofuran, to which a catalytic amount of p-toluenesulfonic acid was added. With stirring at 20° C., 7.2 g (0.10 mol) of ethyl vinyl ether was added. After one hour of reaction, the reaction solution was neutralized with concentrated aqueous ammonia and added dropwise to 10 liters of water, obtaining a white precipitate. It was collected by filtration, dissolved in 100 ml of acetone, added dropwise to 10 liters of water for purification by re-precipitation. The resin was collected by filtration and dried in vacuum.

The polymer was analyzed by PNMR, finding that 10 mol % of the hydrogen atoms of hydroxyl groups in the novolac resin were esterified with 1,2-naphthoquinonediazidosulfonyl, and 8 mol % ethoxyethylated (Polym. 1).

Synthetic Example 5

Under light-shielded conditions, a three-necked flask equipped with a stirrer, dropping funnel, condenser, and thermometer was charged with 120 g (1 mol) of novolac resin A obtained in Synthetic Example 1, 21.5 g (0.08 mol) of 1,2-naphthoquinonediazidosulfonyl chloride, and 400 ml of dioxane. After dissolution, 8.1 g (0.08 mol) of triethylamine was added dropwise such that the internal temperature might not exceed 30° C. After one hour of ripening, the reaction solution was poured into 5,000 ml of 0.1N aqueous hydrochloric acid. The resulting precipitate was collected by filtration, dissolved in 800 g of ethyl acetate, washed with water, and separated. The solvent was removed by vacuum stripping at 40° C., followed by vacuum drying. The resulting resin was dissolved in 400 g of tetrahydrofuran, to which a catalytic amount of p-toluenesulfonic acid was added. With stirring at 20° C., 3.6 g (0.05 mol) of ethyl vinyl ether and 3.5 g (0.03 mol) of 1,4-butane diol divinyl ether were added. After one hour of reaction, the reaction solution was neutralized with concentrated aqueous ammonia and added dropwise to 10 liters of water, obtaining a white precipitate. It was collected by filtration, dissolved in 100 ml of acetone, added dropwise to 10 liters of water for purification by re-precipitation. The resin was collected by filtration and dried in vacuum.

The polymer was analyzed by PNMR, finding that 8 mol % of the hydrogen atoms of hydroxyl groups in the novolac resin were esterified with 1,2-naphthoquinonediazidosulfonyl, 4 mol % ethoxyethylated, and 4.8 mol % crosslinked with —$CH_2CH_2O$—$(CH_2)_4$—$OCH_2CH_2$— (Polym. 2).

Synthetic Example 6 (Comparative Example 1)

Under light-shielded conditions, a three-necked flask equipped with a stirrer, dropping funnel, condenser, and thermometer was charged with 120 g (1 mol) of novolac resin B obtained in Synthetic Example 2, 26.8 g (0.10 mol) of 1,2-naphthoquinonediazidosulfonyl chloride, and 400 ml of dioxane. After dissolution, 10.1 g (0.10 mol) of triethylamine was added dropwise such that the internal temperature might not exceed 30° C. After one hour of ripening, the reaction solution was poured into 5,000 ml of 0.1N aqueous hydrochloric acid. The resulting precipitate was collected by filtration, dissolved in 800 g of ethyl acetate, washed with water, and separated. The solvent was removed by vacuum stripping at 40° C., followed by vacuum drying. The resulting resin was dissolved in 400 g of tetrahydrofuran, to which a catalytic amount of p-toluenesulfonic acid was added. With stirring at 20° C., 6.9 g (0.08 mol) of ethyl 1-propenyl ether was added. After one hour of reaction, the reaction solution was neutralized with concentrated aqueous ammonia and added dropwise to 10 liters of water, obtaining a white precipitate. It was collected by filtration, dissolved in 100 ml of acetone, added dropwise to 10 liters of water for purification by re-precipitation. The resin was collected by filtration and dried in vacuum.

The polymer was analyzed by PNMR, finding that 10 mol % of the hydrogen atoms of hydroxyl groups in the novolac resin were esterified with 1,2-naphthoquinonediazidosulfonyl, and 6.1 mol % ethoxypropylated (Polym. 3).

Synthetic Example 7 (Comparative Example 2)

Under light-shielded conditions, a three-necked flask equipped with a stirrer, dropping funnel, condenser, and thermometer was charged with 120 g (1 mol) of novolac resin C obtained in Synthetic Example 3, 34.9 g (0.13 mol) of 1,2-naphthoquinonediazidosulfonyl chloride, and 400 ml of dioxane. After dissolution, 8.1 g (0.08 mol) of triethylamine was added dropwise such that the internal temperature might not exceed 30° C. After one hour of ripening, the reaction solution was poured into 5,000 ml of 0.1N aqueous hydrochloric acid. The resulting precipitate was collected by filtration, dissolved in 800 g of ethyl acetate, washed with water, and separated. The solvent was removed by vacuum stripping at 40° C., followed by vacuum drying. The resulting resin was dissolved in 400 g of tetrahydrofuran, to which a catalytic amount of p-toluenesulfonic acid was added. With stirring at 20° C., 17.2 g (0.20 mol) of ethyl 1-propenyl ether and 30.3 g (0.15 mol) of triethylene glycol divinyl ether were added. After one hour of reaction, the reaction solution was neutralized with concentrated aqueous ammonia and added dropwise to 10 liters of water, obtaining a white precipitate. It was collected by filtration, dissolved in 100 ml of acetone, added dropwise to 10 liters of water for purification by re-precipitation. The resin was collected by filtration and dried in vacuum.

The polymer was analyzed by PNMR, finding that 8 mol % of the hydrogen atoms of hydroxyl groups in the novolac resin were esterified with 1,2-naphthoquinonediazidosulfonyl, 15 mol % ethoxypropylated, and 10.8 mol % crosslinked with —$CH_2CH_2O$—$(CH_2CH_2)_3$—$OCH_2CH_2$— (Polym. 4).

For these novolac resins Polym. 1 to 4, Table 2 reports the starting novolac resins and the degrees of substitution by 1,2-naphthoquinonediazidosulfonyl ester (NQD) groups, substituted acetal groups (exclusive of crosslinked ones), and crosslinking groups.

TABLE 2

| Synthetic Example | Product novolac resin | Starting novolac resin | NQD substitution (mol %) | Acetal substitution (mol %) | Cross-linking (mol %) |
|---|---|---|---|---|---|
| 4 | Polym. 1 | A | 10 | 8 | — |
| 5 | Polym. 2 | A | 8 | 4 | 4.8 |
| 6 | Polym. 3 | B | 10 | 6.1 | — |
| 7 | Polym. 4 | C | 8 | 15 | 10.8 |

Example 1

In 100 g of propylene glycol monomethyl ether acetate, 50 g of novolac resin Polym. 1 was dissolved together with 0.125 g of a surfactant FC-430 (trade name, Sumitomo 3M). The solution was passed through a membrane filter with a pore size of 0.2 μm, obtaining a resist solution.

The resist solution was applied onto a 6-inch bare silicon wafer by means of a spinner and pre-baked on a hot plate at 100° C. for 120 seconds to form a resist film of 3.0 μm thick. The resist film was exposed to light using an i-line stepper NSR-1755i7 (Nikon K.K., NA=0.5), followed by development and rinsing with pure water. The resulting pattern was examined. By observing a 10-μm line-and-space pattern under an SEM (Hitachi K.K.), it was examined whether or not side walls of the pattern were perpendicular to the substrate. The resolution was determined by examining whether resist scum was present or absent in spaces. A 1.5-μm line-and-space pattern was observed to see whether or not the pattern flowed, by which the adhesion to the substrate was determined.

Example 2 and Comparative Examples 1, 2

Resist patterns were formed as in Example 1 using the novolac resins of Synthetic Examples 5 to 7. Resolution was evaluated in terms of the perpendicularity of pattern side walls to the substrate and the presence of resist scum in spaces. Adhesion to the substrate was evaluated in terms of the pattern flow examined by an observation of the 1.5 μm line-and-space pattern.

The results are shown in Table 3.

TABLE 3

| | Novolac resin | Side wall perpendicularity and resolution | Adhesion to substrate |
|---|---|---|---|
| E1 | Polym. 1 | perpendicular, no scum | no pattern flow |
| E2 | Polym. 2 | perpendicular, no scum | no pattern flow |
| CE1 | Polym. 3 | not resolved | — |
| CE2 | Polym. 4 | marked pattern slimming | pattern flow |

Japanese Patent Application No. 2000-030483 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A polymer in the form of a novolac resin comprising recurring units of formula (1), wherein the novolac resin has a weight average molecular weight of 1,000 to 30,000 calculated as polystyrene, some of the hydrogen atoms of hydroxyl groups on the novolac resin are replaced by 1,2-naphthoquinonediazidosulfonyl ester groups, and some of the hydrogen atoms of the remaining hydroxyl groups are replaced by acid labile groups of formula (2) and/or are crosslinked within a molecule or between molecules with crosslinking groups having C—O—C linkages of formula (3),

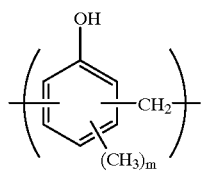

(1)

wherein m is an integer of 0 to 3,

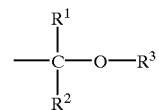

(2)

wherein $R^1$ and $R^2$ are independently hydrogen or a straight, branched or cyclic alkyl group of 1 to 6 carbon atoms $R^3$ is a straight, branched or cyclic alkyl group at 1 to 30 carbon atoms, aryl group of 6 to 20 carbon atoms or aralkyl group of 7 to 20 carbon atoms, or $R^1$ and $R^2$, $R^1$ and $R^3$, or $R^2$ and $R^3$, taken together, optionally form a ring, and each of $R^1$, $R^2$ and $R^3$ is a straight or branched alkylene group of 1 to 18 carbon atoms when part of a ring,

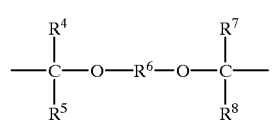

(3)

wherein $R^4$, $R^5$, $R^7$ and $R^8$ are independently hydrogen or a straight, branched or cyclic alkyl group of 1 to 6 carbon atoms, or $R^4$ and $R^5$, and $R^7$ and $R^8$, taken together, optionally form a ring, and each of $R^4$, $R^5$, $R^7$ and $R^8$ is a straight or branched alkylene group of 1 to 17 carbon atoms when part of a ring, and $R^6$ is a divalent hydrocarbon group of 1 to 6 carbon atoms which optionally contains an oxygen atom.

2. A positive resist composition comprising the polymer of claim 1.

3. A polymer according to claim 1, where m is 1 or 2.

4. A polymer according to claim 1, wherein each of $R^1$, $R^2$ and $R^3$ is a straight or branched alkylene group of 1 to 8 carbon atoms when part of a ring.

5. A polymer according to claim 1, wherein each of $R^4$, $R^5$, $R^7$ and $R^8$ is a straight or branched alkylene group of 2 to 8 carbon atoms when part of a ring.

6. A polymer according to claim 1, wherein, $R^6$ is

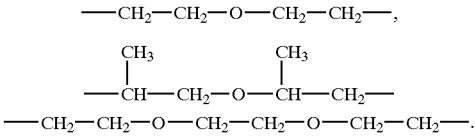

7. A polymer according to claim 1, wherein the hydrogen atoms of the hydroxyl groups in the novolac resin replaced by 1,2-naphthoquinonediazidosulfonyl ester groups comprise 3 to 30 mol% of the hydrogen atoms of the hydroxyl groups of the novolac resin.

8. A polymer according to claim 1, wherein the hydrogen atoms of the hydroxyl groups in the novolac resin replaced by 1,2-naphthoquinonediazidosulfonyl ester groups comprise 5 to 20 mol% of the hydrogen atoms of the hydroxyl groups of the novolac resin.

9. A polymer according to claim 1, wherein the hydrogen atoms of the hydroxyl groups in the novolac resin replaced by acid labile groups of formula (2) and/or are crosslinked with crosslinking groups of formula (3) comprise 1 to 50 mol% of the hydrogen atoms of the hydroxyl groups of the novolac resin.

10. A polymer according to claim 1, wherein the hydrogen atoms of the hydroxyl groups in the novolac resin replaced by acid labile groups of formula (2) and/or are crosslinked with crosslinking groups of formula (3) comprise 1 to 50 mol% of the hydrogen atoms of the hydroxyl groups of the novolac resin.

11. A polymer according to claim 1, wherein the novolac resin has a weight average molecular weight of 3,000 to 20,000 calculated as polystyrene.

12. A positive resist composition according to claim 2 further comprising a solvent.

13. A positive resist composition according to claim 2 further comprising a dye, a pigment, a surfactant or a mixture thereof.

14. A resist pattern comprising the resist composition of claim 2.

15. A process to prepare a polymer according to claim 1 comprising subjecting a novolac resin of formula (1) and 1,2-naphthoquinonediazidosulfonyl chloride to a dehydrochlorination reaction and then to an addition reaction with an alkenyl ether compound or dialkenyl ether compound in the presence of an acid catalyst.

* * * * *